Patented May 27, 1941

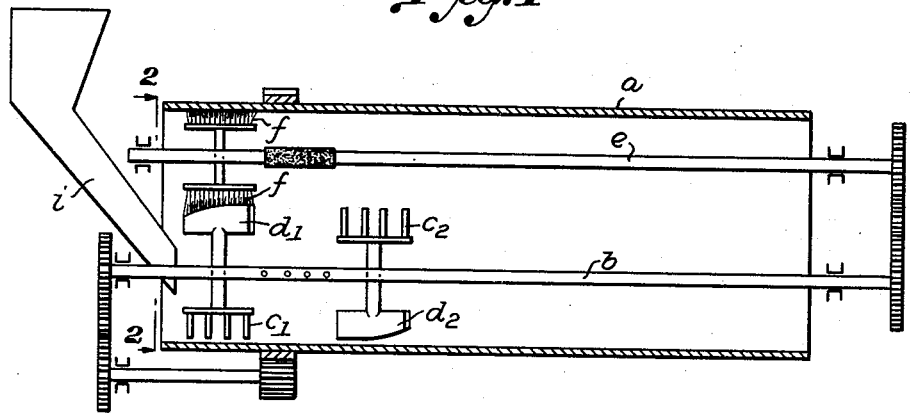
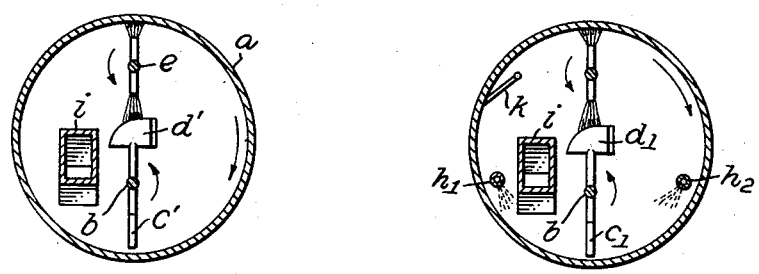
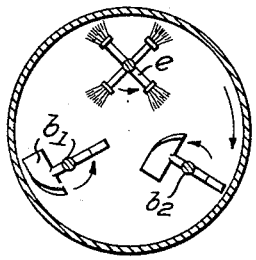
Inventor.
HANS LEHRECKE
By Bailey & Larson
his Attorneys.

2,243,384

UNITED STATES PATENT OFFICE 2,243,384

APPARATUS FOR MIXING AND GRANULATING SUBSTANTIALLY PLASTIC MATERIALS

Hans Lehrecke, Landskrona, Sweden, assignor to Aktiebolaget Kemiska Patenter, Landskrona, Sweden Application October 3, 1939, Serial No. 297,775
In Germany October 19, 1938

5 Claims. (Cl. 259—3)

The invention relates to an apparatus for mixing and granulating substantially plastic materials, preferably superphosphate, and has for its object to carry out securely and effectively the transforming of such solid or plastic materials into granular aggregates of small size.

Different working methods and apparatus have been proposed to mix and granulate solid or plastic materials. Especially in the fertiliser industry, recently such apparatus have been of increasing interest, because the employment of fertilisers in granulated state becomes more and more customary. As far as the initial materials are not molten masses or aqueous solutions, the following working method has been generally employed for this purpose: The solid substances in being rolled and/or agitated were moistened with a predetermined quantity of water dependent on the actual condition of the substances, and the agitating was continued until the material had been conglomerated into more or less large agglomerates. The thus granulated material was then submitted to a drying process in order to impart to the grains the desired hardness.

For carrying out this working method, ordinarily revolving drums have been used, both for the first stage of the method as well as for the drying in the second stage. This method results in the advantage of continual operation but possesses the inconvenience of less efficiency. It further presents the difficulty that, especially with plastic material, large lumps form easily in the drum, and these lumps must be reduced to smaller pieces whereby the efficiency of the plant was further lowered.

Another working method consists, for instance, wherein the material to be mixed and to be granulated is brought into a round container, rotating about its vertical axis and open at the upper end, and including suitable stirring devices which circulate in the direction opposite the direction of rotation of the container. These devices have the advantage of a considerably greater efficiency as compared with the previous mentioned revolving drums, but they possess the serious inconvenience that they cannot work continuously. It is, besides, necessary to frequently clean the stirring tools by hand, as the material to be treated easily sticks to the same.

The apparatus according to the invention combines the advantage of continuous operation with that of high efficiency and otherwise avoids the inconveniences of the above mentioned devices. The apparatus according to the invention is characterised in that within a horizontal revolving tube and independent of the same one or several axles are arranged, preferably eccentrically in the longitudinal direction of the revolving tube, which axles carry stirring and turning-over tools such as rakes, blades, scrapers and the like, and revolve in a direction which is opposite to that of the revolving tube, so that the material, when passing through the revolving tube, is gripped by the stirring and turning-over tools and is discharged from the revolving tube in granulated state. The material introduced into the apparatus is carried along during the operation of the apparatus by the circulating revolving tube, and encounters on its travel the rakes, blades and the like rotating in opposite direction and which impart to the material a turning-over and rolling movement in conveying it at the same time from one end to the other end of the revolving tube. This conveying may be effected by the rotating stirring tools as well as by the blades, the angle of which with respect to the horizontal axis being adjustable as required. During the travel of the material through the revolving tube, it is not only very intensively mixed, which is essential, for instance with the production of mixed fertilisers, but also it is granulated at the same time. The addition of water which may be necessary can be effected by injecting the desired quantity within the revolving tube.

Another form of construction of the apparatus according to the present invention consists therein that, besides the axle or axles equipped with stirring and turning-over tools, one or several other axles are mounted in the revolving tube preferably above the first mentioned axle or axles, these additional axles being equipped with stationary or circulating cleaning tools such as brushes, beaters or the like which are destined to automatically and continually clean the stirring and conveying tools of the other axle or axles and, if desired, also the inner wall of the revolving drum. This means an extraordinary facilitation for the service and saves considerably the manual labour as compared with all other known working methods and devices. This construction according to the invention ensures further the production of a more uniform product.

The automatic cleaning of the revolving drum may be effected, if desired, by separately arranged stationary scrapers, knives and the like.

An embodiment of the invention is illustrated by way of example in the accompanying drawing, in which Fig. 1 shows the apparatus in longitudinal section.

Fig. 2 is a cross-section on line 2—2 of Fig. 1 of the special arrangement in the revolving tube.

Fig. 2A shows in cross section the construction of Figs. 1 and 2 with additional features added thereto.

Fig. 3 shows in cross-section another construction of the arrangement according to Fig. 2.

In the revolving tube $a$ (Fig. 1) an axle $b$ is journaled which revolves in a direction opposite to that of the revolving tube. On this axle stirring tools, such as rakes $c_1$—$c_2$ shown in the drawing and material advancing and turning-over tools such as blades $d_1$—$d_2$ are mounted, these tools being preferably arranged pairwise and mutually displaced at right angles. The material to be mixed and granulated enters at $i$ into the revolving tube.

In the upper half of the revolving tube a second axle $e$ is journaled which revolves in a direction opposite to that of the axle $b$. Cleaning tools $f$, such as brushes, beaters or the like, are mounted on this axle $e$ and as they rotate, contact and clean the stirring and turning-over tools upon the axle $b$.

In Fig. 2A the spraying of water which may be necessary can take place by means of spraying pipes $h_1$ and $h_2$ which preferably inject fine sprays of water into tube $a$. The inner wall of the drum may also be cleaned, if desired, by stationary scrapers $k$.

Fig. 3 shows the same arrangement with double axles $b_1$ and $b_2$, on which the stirring and turning-over tools are mounted, whereas the axle $e$ equipped with cleaning tools is journaled above said two axles $b_1$ and $b_2$. This axle $e$ is equipped with a larger number of brushes, beaters or the like.

I claim:

1. In an apparatus for mixing and granulating substantially plastic materials, and including a horizontal drum mounted for rotation about its longitudinal axis, a shaft mounted within said drum offset from said axis and rotatable in a direction opposite that of said drum, and tools for working said materials mounted upon said shaft, said tools comprising means for raking said plastic materials, and means for turning over said plastic materials said means being respectively alternately disposed longitudinally of said shaft, whereby said materials are simultaneously mixed and granulated within said drum.

2. In an apparatus for mixing and granulating substantially plastic materials, and including a horizontal drum mounted for rotation about its longitudinal axis, a shaft mounted within said drum offset from said axis and rotatable in a direction opposite that of said drum, and tools for working said materials mounted upon said shaft, said tools comprising at least one rake, and a radially oppositely disposed blade whereby said materials are simultaneously mixed and granulated within said drum.

3. In an apparatus for mixing and granulating substantially plastic materials, and including a horizontal drum mounted for rotation about its longitudinal axis and through which said materials are adapted to travel from one end to the other, a plurality of shafts offset from said axis and mounted for rotation within said drum in a direction opposite from that of said drum, and tools mounted upon said shafts for working said materials, said tools comprising substantially radially and oppositely disposed rakes and blades, alternately disposed along said shafts adapted to stir and turn over, respectively, said materials during their passage through said drum.

4. An apparatus for stirring and disintegrating substantially plastic materials comprising a horizontal drum mounted for rotation about its longitudinal axis, a plurality of shafts longitudinally extending within said drum and offset from said axis, one of said shafts being mounted for rotation in a direction opposite that of said drum, stirring and turning-over tools mounted upon said shaft, and cleaning tools mounted upon another of said shafts and being adapted to contact and clean said stirring and turning over tools.

5. An apparatus as in claim 4, said shaft bearing said cleaning tools being mounted above said shaft bearing said stirring and turning over tools, and being adapted to rotate in an opposite direction therefrom.

HANS LEHRECKE.